United States Patent
Agnihotri et al.

(10) Patent No.: US 6,912,517 B2
(45) Date of Patent: Jun. 28, 2005

(54) INTELLIGENT INFORMATION DELIVERY SYSTEM

(75) Inventors: Lalitha Agnihotri, Fishkill, NY (US); John Zimmerman, Ossining, NY (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 584 days.

(21) Appl. No.: 09/998,057

(22) Filed: Nov. 29, 2001

(65) Prior Publication Data

US 2003/0101150 A1 May 29, 2003

(51) Int. Cl.[7] .................... G06F 17/00; H04Q 7/20
(52) U.S. Cl. .................... 706/45; 455/456; 725/35
(58) Field of Search .................... 706/45; 455/456; 725/35

(56) References Cited

U.S. PATENT DOCUMENTS

| | | | |
|---|---|---|---|
| 5,532,680 A | | 7/1996 | Ousborne .................... 340/567 |
| 5,781,108 A | | 7/1998 | Jacob et al. ................ 340/552 |
| 5,881,131 A | * | 3/1999 | Farris et al. .............. 379/15.03 |
| 6,006,257 A | * | 12/1999 | Slezak ........................ 725/110 |
| 6,147,608 A | | 11/2000 | Thacker .................... 340/573.1 |
| 6,160,989 A | * | 12/2000 | Hendricks et al. ............. 725/36 |
| 6,725,048 B2 | * | 4/2004 | Mao et al. ................ 455/456.2 |
| 6,738,978 B1 | * | 5/2004 | Hendricks et al. ............. 725/35 |
| 6,816,720 B2 | * | 11/2004 | Hussain et al. .......... 455/404.2 |
| 2002/0059370 A1 | | 5/2002 | Shuster ....................... 709/203 |

FOREIGN PATENT DOCUMENTS

| | | |
|---|---|---|
| FR | 2799096 A1 | 3/2001 |
| WO | 0175676 A2 | 10/2001 |

OTHER PUBLICATIONS

Sinha, "A Priority Queue Based Approach to Service Subscriber Profile: Queries in Cellular Networks", IEEE Southeastcon, Ap 2000.*

"Adapting Multimedia Internet Content for Universal Access", by R. Mohan et al., IEEE Tranactions on Multimedia (Mar. 1999) pp. 104–114.

* cited by examiner

Primary Examiner—George Davis (57) ABSTRACT

A system and method for delivering relevant information to recipients in a timely manner. Information from a plurality of sources is received through interface devices that permit a central processor to evaluate each information stream in light of the dynamic profiles that are stored in a subscriber database. A plurality of location sensors track and report the location of the various recipients. The processor determines the content that will be provided to the recipient and the delivery mode to be used for delivering the selected information to the subscriber.

41 Claims, 9 Drawing Sheets

INTELLIGENT INFORMATION DELIVERY SYSTEM

CROSS-REFERENCE TO RELATED APPLICATIONS

This invention searches for and processes information for delivery to a recipient, as does co-pending application Ser. No. 09/627,188, entitled Transcript Triggers for Video Enhancement, filed by Thomas McGee, Nevenka Dimitrova, and Lalitha Agnihotri, assigned to the assignee of the present application, and incorporated by reference herein.

TECHNICAL FIELD OF THE INVENTION

The present invention is directed generally to electronic information delivery systems, and more specifically to an automated system and method for collecting, processing, and delivering personalized information to an individual in a timely and efficient manner.

BACKGROUND OF THE INVENTION

Prior to the explosive growth of electronic communications systems in the relatively-recent past, the typical individual's problem with "information" was getting timely access to it. News of local events, regional business and politics, and even news of entertainment value was delivered by newspaper, mail, or word of mouth. Not only were such methods slow, but were relatively inconsistent so far as delivering information that was useful to the particular individual at the time of delivery. There was often very little people could do to improve the situation; the number of media sources was very limited. A person's only recourse was to do the best they could with the news and information that actually made it to them.

The quality of information delivery improved greatly, of course, with the advent of broadcast radio and television, and the public-switched telephone network. Delivery was now virtually instantaneous. As much of an improvement as these innovations represented, however, an individual was still required to be present at the location of a particular delivery device (for example, telephone, television, or radio) at the proper time in order to retrieve information of interest. And, at least in the case of TV and radio, presence at a particular time of day was necessary. Information had become much easier to obtain, but delivery was, for practical reasons, still in some ways inconsistent.

Information delivery improved again as new information networks, and new devices to tap into them were introduced. Wireless cellular phones became portable and could be carried with the individual who could thereby have access at least to information that was available from a called party—a source with whom the individual could make telephone contact. Personal computers are themselves relatively inefficient information sources, but when connected to a network, they give their users access to a wide variety of information. The ubiquity of the Internet especially, in conjunction with the World Wide Web, enables an individual to access information of personal interest from a vast array of providers. And personal computers are becoming more portable and easier to use for network connections while traveling from one place to another.

These developments in electronics and communications have not only provided greater access to information from a wide array of sources, but indirectly they have led to the availability of an even greater amount of information. Spurred by the prospects of profit, visibility, or greater public awareness that attaches to successful information sourcing, a multitude of providers have made their information content available, either to the public at large, or to subscribers, through the Internet, broadcast and community-antenna television, and a variety satellite communications networks. Information made accessible almost anywhere no longer has to be of general interest, but given the number of channels through which it may be received, it may be more esoteric and of interest only to a narrow population segment that accesses it.

Yet for all the advances made in recent years that continue to provide an ever-increasing amount of information that is easily available to an ever-expanding segment of the population, access to information remains a concern—though for a different reason than in years past. Whereas before, timely information access was largely hindered by the limited means of delivery, a key obstacle today is the overwhelming amount of content constantly being transmitted. There remains, of course, matters of general interest that are efficiently disseminated through broadcast, and items of purely personal interest that are obtained through mail, telephone, and facsimile. A large amount of information in between these opposite ends of the information spectrum, however, remains almost universally available, but at the same time, difficult to access in an efficient fashion because it is intermingled with so much other information. Moreover, information recipients are more mobile than ever, and so the problem remains not only sorting through this vast supply of information for news that is relevant to them, but doing so while they are on the move.

Needed is an automated way to obtain delivery of individually relevant information at an individual's present location and at the most opportune possible time and in a personalized manner. The present invention provides just such a system and method.

SUMMARY OF THE INVENTION

To address the above-discussed deficiencies of the prior art, it is a primary object of the present invention to provide an intelligent information delivery system that, based on a subscriber's personal preferences and current location, collects a wide variety of information, prioritizes it, and then selectively delivers relevant and timely portions of it to the subscriber.

In one aspect, the present invention is a system for achieving the timely delivery of relevant information that includes a central processor connected to a plurality of information network interfaces. The interfaces may themselves include memory for buffering input until it can be analyzed by the processor. A subscriber database contains a dynamic user profile for controlling the process of information filtering by the processor. The system database also contains current priority-weighted location information for each recipient, so that the filtered content may be appropriately delivered. A plurality of location sensors provide the current-location information for storage in the system database. In a particularly preferred embodiment, the system also searches automatically for additional, related information content with which to augment the primary content stream.

In another aspect, the present invention is a method for the timely delivery of relevant information that includes the steps of providing a central processor, populating a subscriber database with dynamic user profiles, collecting current location information, and continuously filtering information from a variety of sources. If desirable, the information filtered out for delivery is augmented with additional content from other sources, which the system automatically searches for when pre-determined criteria have been met. The method further includes determining the appropriate delivery mode and executing delivery.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged information network.

Figure 1:
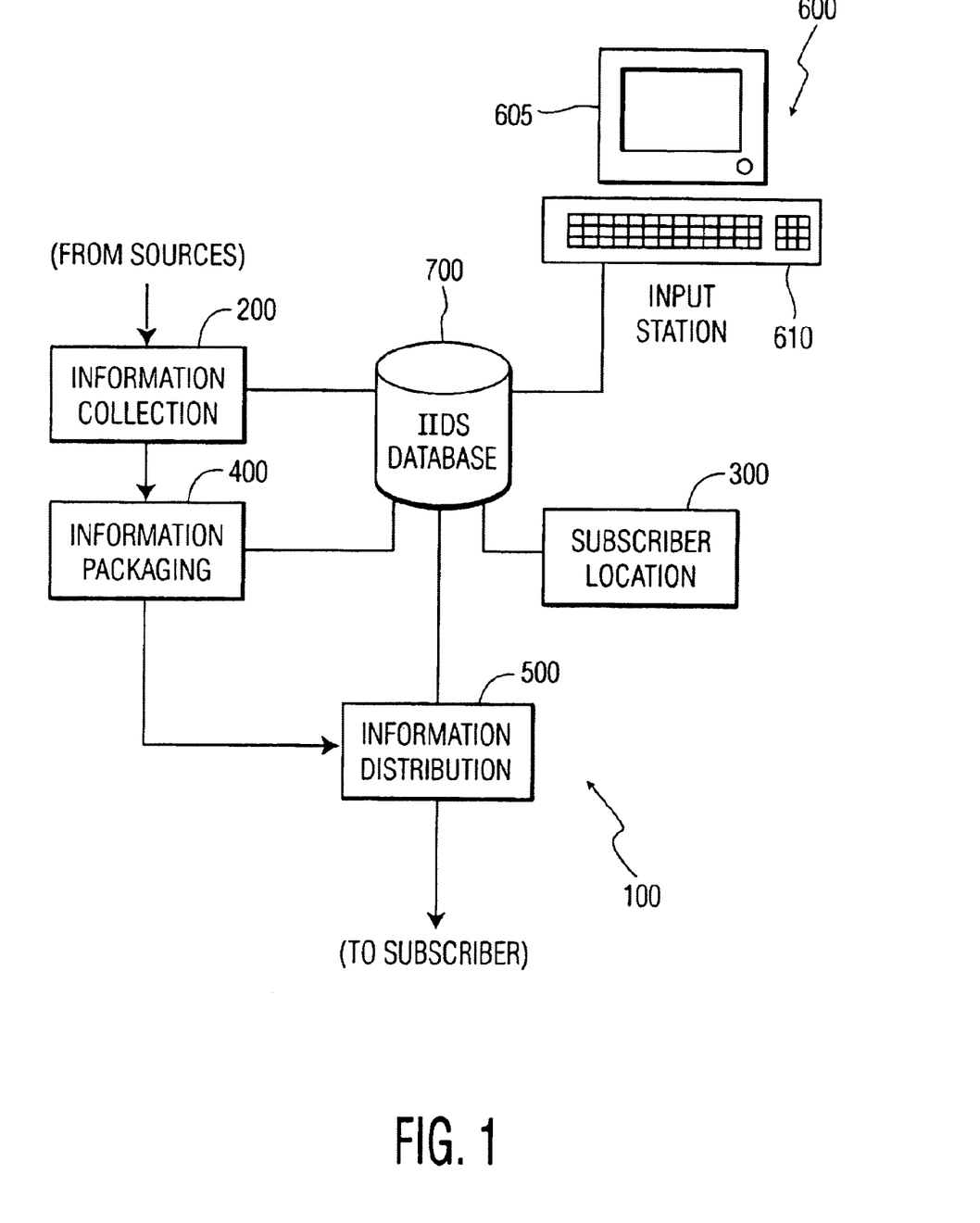
FIG. 1 is a block diagram illustrating the interrelationship of selected subsystems of the intelligent information delivery system (IIDS) of the present invention.

FIG. 1 is a block diagram illustrating an overview of an intelligent information delivery system (IIDS) 100 according to an embodiment of the present invention. Through the IIDS, information received from many sources in any number of formats or modes of communication is processed and selectively delivered to a subscriber. Note that the term "subscriber" is used for convenience, but the system and method of the present invention may be used either by an individual or individuals acting on their own, in a user group, or by actual subscription to an IIDS service. Hence the term "subscriber" will apply to all of them and other similar situations. Information collection subsystem 200 receives information from a wide variety of sources, public and private. The subscriber must naturally provide connections to these sources, some through subscription. In-home or in-business sources may, of course, be installed and connected by the user, public sources may arrive over the airwaves, though reception equipment will usually have to be installed by the user. In addition, the user will have to ensure that all desired information inputs are properly connected to collection subsystem 200. Of course, the user may also obtain all inputs from a single media source, one that itself collects and combines the inputs (including, perhaps, local inputs) so that the user does not have to be involved in this process. In other words, collection subsystem 200 may be located on-site or off-site.

Note that, as used herein, the term "on-site" refers generally to a location (fixed or mobile) that could be defined as a primary location where the user may be found for a significant amount of time. The purpose of the IIDS 100 is to deliver information to the user. If the subscriber were to remain at one location, this task would be somewhat simplified, but the typical subscriber does not. Still, the user's home or place of business may be a place where he or she is most often found. The components of collection subsystem 200 will most often, though not necessarily, be found on-site.

As the information is collected by collection subsystem 200, it is fed to information packaging subsystem 400. Packaging subsystem 400 determines what portions of the vast amount of collected information should be forwarded to the subscriber. The amount of information actually received may be tremendous, but only a relatively small percentage of it is presently useful to the user. Packaging subsystem 400, using the information stored on intelligent information delivery system database 700, determines what content is to be passed on and if desired combines information from multiple sources.

Currently relevant information is thereafter passed on to information distribution subsystem 500, which processes the information to put it into the appropriate format for transmission to the user by the best available means under the circumstances. This determination is made in part based on location information provided by subscriber location subsystem 300 and stored on IIDS database 700. Location subsystem 300 continuously collects information regarding the current location of the user and using information stored on database 700 regarding locations where the user is most likely to be.

Database 700 may be located on- or off-site. In a preferred embodiment, it is housed in an on-site IIDS server (not shown) The IIDS server, which may be a dedicated computing device or a resident function on a device used for other purposes as well, such as a personal computer or television set top box, may also house portions of some or all of the subsystems illustrated in FIG. 1. Likewise, database 700 may be distributed, that is, the various data stored thereon in accordance with the present invention may also be stored in data storage facilities associated with the various subsystems, if they are not located in a central IIDS server. The data may also be mirrored at numerous locations, that is, copied both initially and whenever updated so that the same information is recorded at one, two, or numerous sites. For convenience and clarity, however, database 700 will herein be referred to as a single storage device residing on an on-site IIDS server, unless another configuration is explicitly described or readily apparent from the context of the related description.

Figure 7:
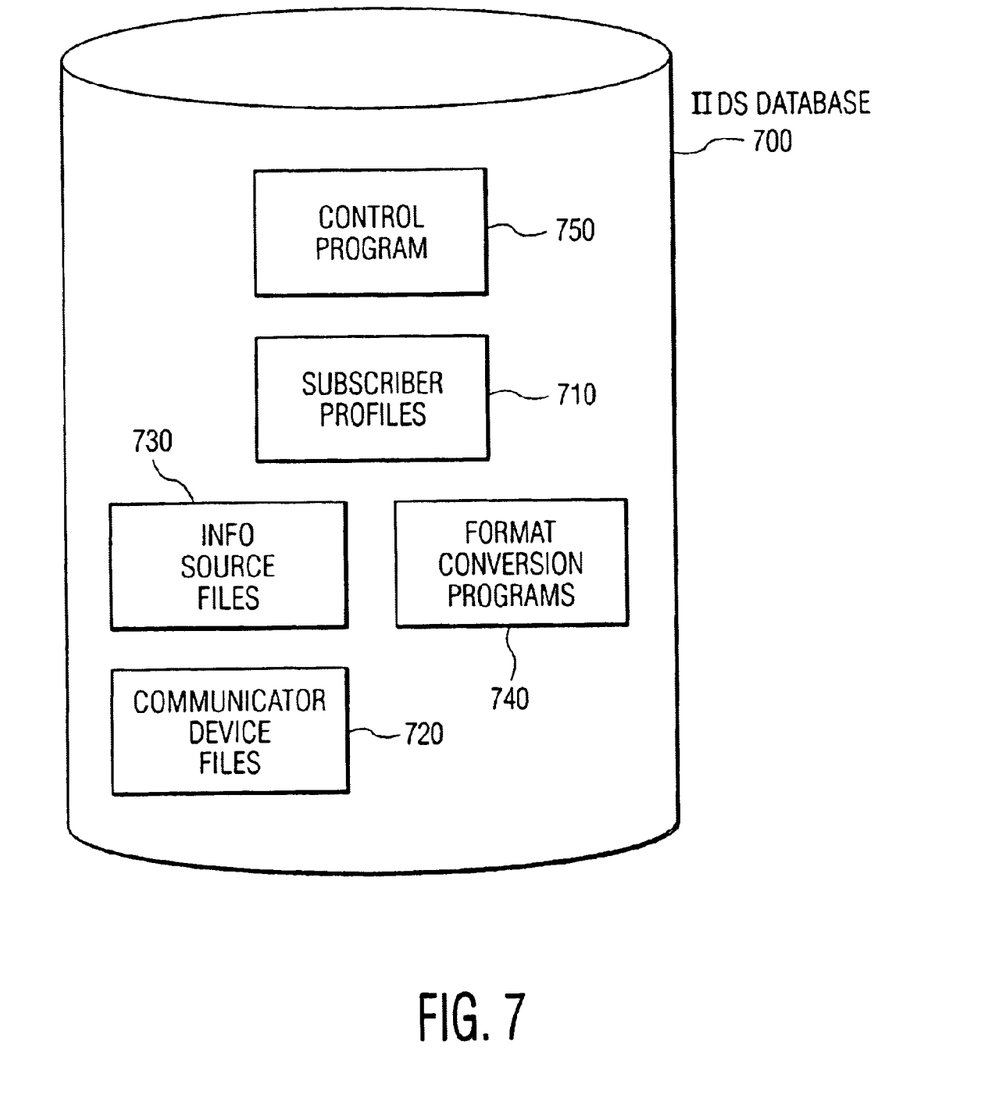
FIG. 7 is a block diagram of selected files stored on a database in accordance with an embodiment of the present invention.

FIG. 7 is a block diagram of selected files stored on database 700 in accordance with an embodiment of the present invention. On database 700 is at least one dynamic profile 710 corresponding to a subscriber. Note that more than one subscriber may be served by the IIDS 100, and one subscriber may, if necessary use more than one profile. For example, a subscriber who regularly travels to one distant city may use one profile when there and another when at home. In a preferred embodiment, a single profile may allow the subscriber to easily switch between these significantly different information needs while still serving basic information requirements regardless of personal movement.

A typical subscriber dynamic profile 710 includes the identity of the subscriber along with a usual place of residence and place of work. The route or routes commonly taken from one to another are also present, either as input by the subscriber or automatically reckoned by a third-party server, such as a Web site available for the task. The time typically spent en route is preferably also included, again either directly input or calculated. In the same fashion, other regular or semi-regular excursions may be included such as trips to church, lodge meetings, or Saturday morning golf outings. Naturally, each of these entries may be deleted or modified, but they represent simply a default activity, one which the system assumes will be conducted on-time unless input to the contrary is received. Vacation or non-routine trips, on the other hand, may be input as limited in duration or provided with an expiration date.

The database 700 also includes a list 720 of available communication devices, cross-referenced to dynamic profile 710. The device list includes, for example, all applicable email addresses, mobile phone numbers, web-enabled telephones, radios, and wireline phones. The devices do not have to be conventional, of course, and may include marquee-display readouts or digital pagers, dedicated speakers and the like. A single device may serve more than one subscriber, of course, and is cross-referenced to each applicable profile 710. The communicator device list 720 will generally include many devices available on-site, so that a subscriber at home, for example, can be informed by the system regardless of their location within the house. Along with each device is listed an address or phone number for establishing contact, as well as the acceptable formats or protocols through which they will accept information feeds. It is through these devices that most of the information delivery will usually be accomplished.

The dynamic profile also contains a source list 730 of preferred information sources, those on which the subscriber most often relies for information. Preferably, this list includes specific channels, such as radio and TV stations, and Web sties where certain types of information may be found. Alternately, it may include certain categories of information, such as sports scores, stock market quotes, and traffic reports. In either alternative, a time of day, day of the week, or event may also be specified, indicating when the particular information will be the most valuable to the subscriber. Along with each source of information in list 730 is stored the format or formats in which it is available. Some sources will include more than one, for example, a Web site may include text, HTML, and multimedia information, and a television station may include audio, video, and text (closed captioning) formats. Conversion programs 740 will sometimes, though not always be necessary to convert the incoming information from its original format to formats acceptable to the various communication devices, and these conversion programs may be stored on the database 700, as well. If audio output is preferred, the incoming text file may be converted to speech by text to speech conversion, or video signal may be reduced to just the audio portion. An IIDS control program 750 for directing the various IIDS operations described herein is preferably also resident in database 700.

Dynamic profile 710 information, such as that described above, is entered by the subscriber through input station 600, shown in FIG. 1 to include a display 605 and keyboard 610, but which may also include other devices such as a mouse, disk drive, tape drive, and the like. It is expected, but not required, that input station 600 will be located on-site. In one embodiment, these components are actually components of a personal computer that is used as the IIDS server itself. Subscriber profile data may also be input through any of the communication devices used for information delivery, provided they are in some way capable of transmitting it to database 700.

Finally, it should be noted that the functions ascribed to the various subsystems depicted in FIG. 1 and the database files shown in FIG. 7 are so illustrated for convenience, and the various components and features of the present invention may in another embodiment be grouped together differently to accomplish the same basic objectives.

Figure 2:
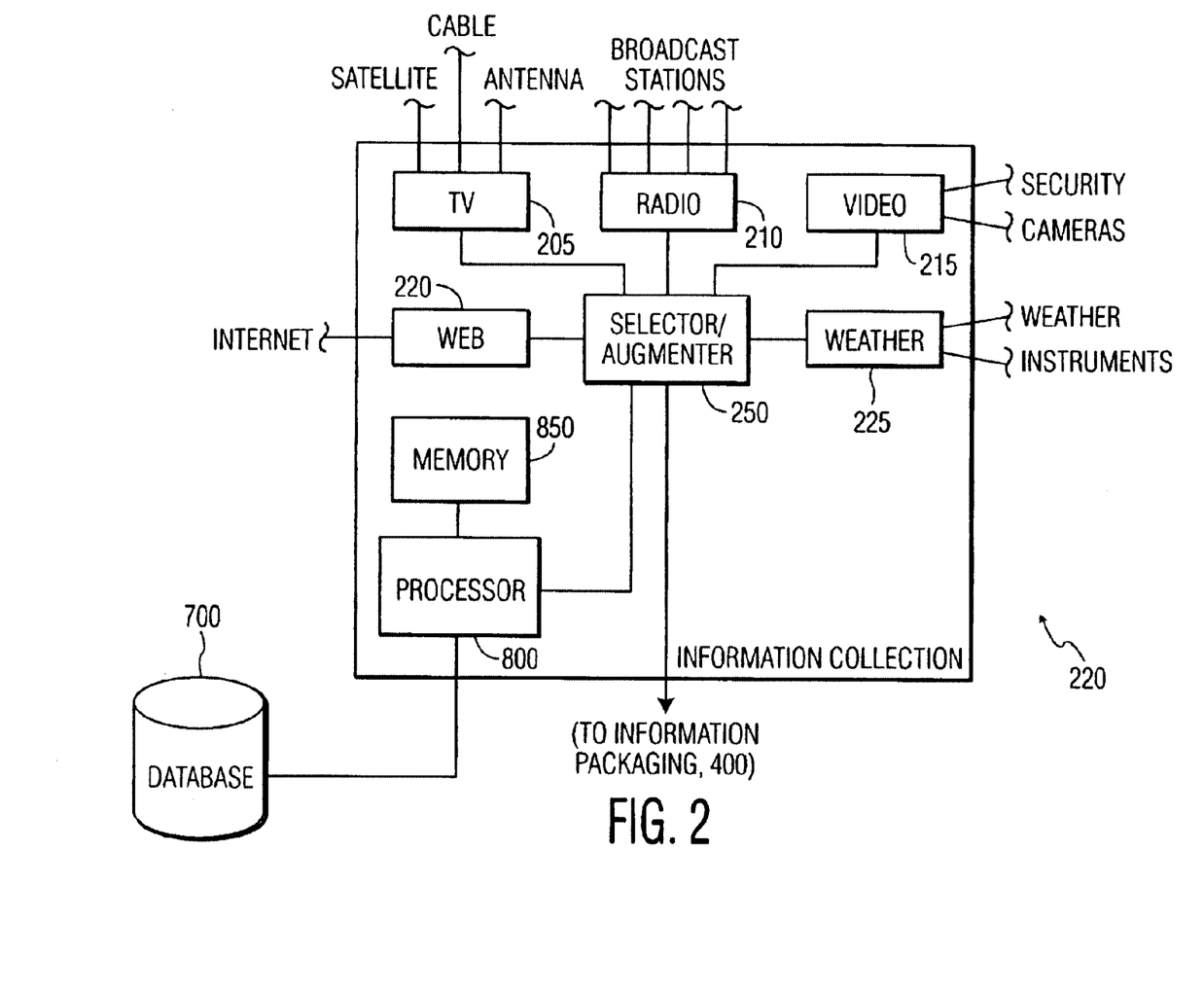
FIG. 2 is a block diagram illustrating in detail selected components of the information collection subsystem shown in FIG. 1, according to one embodiment of the present invention.

FIG. 2 is a block diagram illustrating in detail selected components of the information collection subsystem 200 shown in FIG. 1, according to one embodiment of the present invention. The information collection subsystem 200 gathers information (sometimes herein referred to as "content") from a variety of sources. Such sources may include broadcast television and radio, CATV, satellite broadcasts, or private networks, a VPN, or a variety of local input devices. Local, in general, refers to inputs captured on-site, that is, from the area proximate to the recipient's server—usually, but not necessarily, a residence. Such local devices may include video cameras (such as security cameras), thermometers and barometers or other weather instrumentation, motion detectors, meters and appliance monitors, and so on. In the embodiment illustrated in FIG. 2, the input from various groups of such input sources is processed by an input processor, namely TV input processor 205, radio input processor 210, home video (that is, security) camera input processor 215, Internet input processor 220, and weather status monitor input processor 225. Other input processors may be included as necessary. Note that each are enumerated in FIG. 2, but may in actuality comprise a plurality of input processors, as necessary based on the sources used. The function of the individual input processors is to choose one of their information inputs, as directed by processor 800 through selector/augmenter 250, and allow the information to pass through to buffer memory 850 or on to information packaging subsystem 400 when selected by selector/augmenter 250. In a preferred embodiment, the input processors also, where applicable, process search and monitoring requests to locate a desired radio station or search the World Wide Web for needed information.

Note that processor 800 is preferably directed by control program 750 on database 700, with which processor 800 is in communication. Processor 800 is also in communication with memory 850 which it utilizes as required in executing instructions from control program 750. As mentioned above, memory 850 also buffers received information until it can be further processed (or, if applicable, discarded), a function that may also be performed using database 700. In FIG. 2 and the FIGS. 3–5 that follow, processor 800, memory 850, and database 700 are enumerated as though they were the same components serving each subsystem—which may well be the case, although it is not necessarily so.

Note also that information may be considered to fall into at least one of three distinct categories, each of which is treated somewhat differently. The first is a constant stream of information. Broadcast sources, both cable and wireless, are always available and monitored for relevant content. For example, an apparatus and method that monitors and parses television-program input as disclosed in related U.S. patent application Ser. No. 09/627,188 entitled Transcript Triggers for Video Enhancement, filed by Thomas McGee, Nevenka Dimitrova, and Lalitha Agnihotri, assigned to the assignee of the present application, and incorporated by reference herein. This may be called passive monitoring because the information source is simply selected and its content reviewed. Active searching, on the other hand, utilizes information such as that available from, for example, the World Wide Web, but that is only transmitted from a source upon request. The input processor corresponding to such a source makes such requests at an appropriate time, as instructed by the processor 800 and in accordance with a dynamic profile 710. Content augmentation is further explained in the following patent applications, which are assigned to the assignee of the present application and incorporated herein by reference: U.S. patent application Ser. No. 09/532,845, entitled System and Method for Automatic Content Enhancement of Multimedia Output Device, filed by N. Dimitrova, L. Agnihotri, T. McGee, and N. Mankovich on Mar. 21, 2000; U.S. patent application Ser. No. 09/351,086, entitled Method and Apparatus for Linking a Video Segment to Another Segment or Information Source, filed by Nevenka Dimitrova on Jul. 9, 1999 (EPO reference no. EP 1 110 156 A1); U.S. patent application Ser. No. 09/627,188, entitled Transcript Triggers for Video Enhancements, filed by T. McGee, N. Dimitrova and L. Agnihotri on Jul. 27, 2000; and U.S. patent application Ser. No. 09/818,303, entitled Automatic Video Retriever Genie, filed by N. Dimitrova and A. Janevski on Mar. 27, 2001.

In a particularly preferred embodiment, information of either the first type or the second type is automatically sought out and processed because it relates to information that is otherwise intended for delivery to the subscriber (or at least made available for delivery). Sometimes referred to as "augmented content", this supplemental is added to the information already marked for delivery because it is closely related, and provides additional content for the subscriber. "Added" could mean simply appended, but may involve interleaving in a manner suited to the device it is being delivered to. For example, a voicemail message that is converted into text and sent as an email to the subscriber's office computer might be augmented with hyperlinks to additional information available through the Web. Alternately, information may be retrieved and attached as a text, graphics, or even audio file. This content augmentation, of course, will also relate to preferences found in dynamic profile 710.

A third type of input may come from alert sources. These information sources are in communication with the information input system, but do not transmit information except on the occurrence of certain predetermined events. These may be weather alarms or simply notices received from the recipient's office computer network. An alert source, in other words, may arise from a warning of actual danger, for example a fire alarm, but may also be simply notice of a more benign event, such as receipt of a voice message on one's home answering machine. While this type of information may be augmented with name and number, et cetera, it may not be regularly subject to additions because of their typically personalized, and often urgent, nature.

In summary, in the illustrated embodiment collection subsystem 200 collects information provided to it from a wide variety of sources, searching for it if necessary, and monitors it for desired content according to the dynamic profile 710. The profile 710 may specify, for example, that the traffic report provided by a given radio station at 7:58 a.m. should always be tuned in or recorded and delivered to the subscriber when the subscriber is ready to leave the house. It may also indicate that Web searches should be done on a periodic basis, but only delivered if streets along the subscriber's route are mentioned. Traffic report information may simply be ignored once the subscriber has reached a certain business or residential district, signaling the impending end of a commute. Some information, in other words, is delivered faithfully (or delivery is at least attempted), while other input is delivered only if it meets certain criteria, depending, for example, on its content or on the subscriber's current location. Once the collection subsystem 200 has collected the information, it is passed along to the packaging subsystem 400 to prepare the information for delivery.

Figure 3:
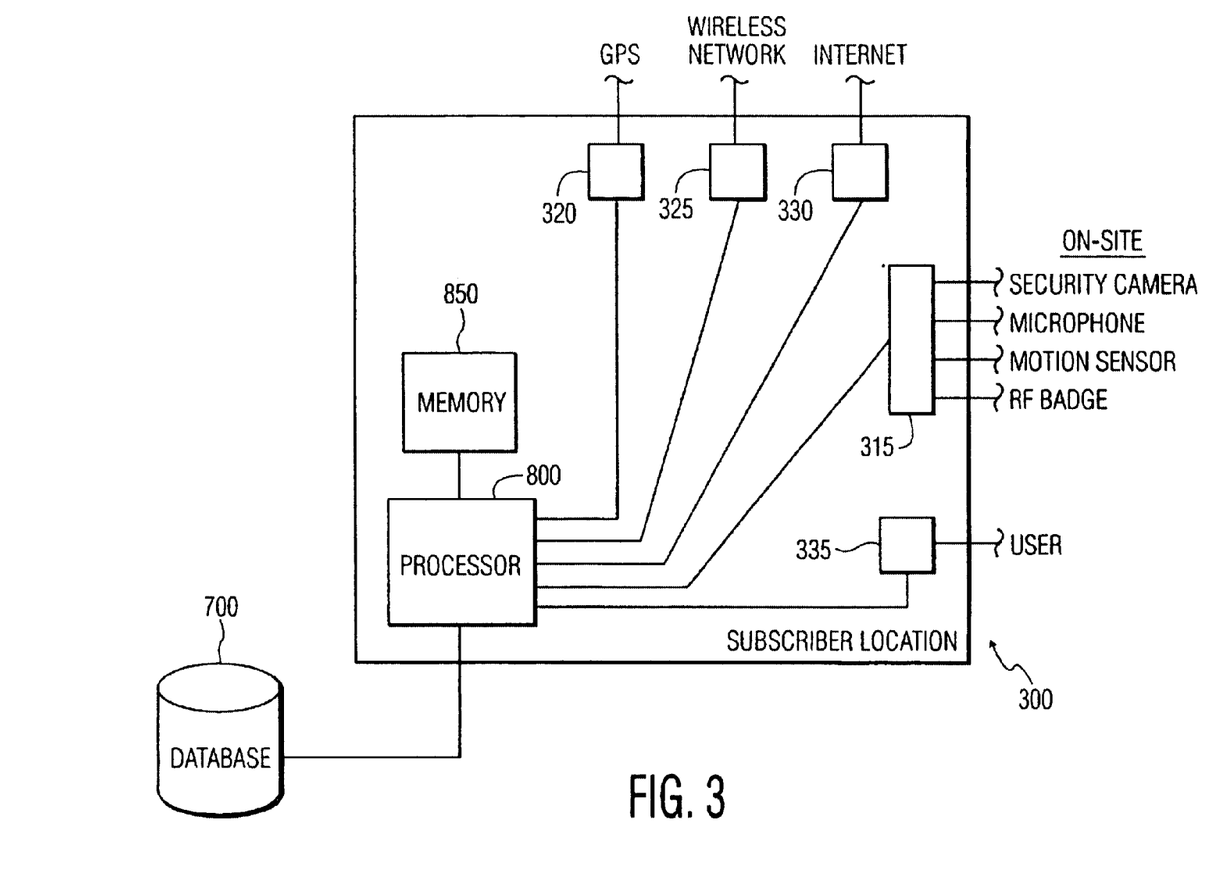
FIG. 3 is a block diagram illustrating in detail selected components of the subscriber location subsystem shown in FIG. 1, according to one embodiment of the present invention.

FIG. 3 is a block diagram illustrating in detail selected components of the subscriber location subsystem 300 shown in FIG. 1, according to an embodiment of the present invention. Processor 800, as directed by control program 750, regularly monitors the current location of the subscriber and updates the dynamic profile 710 so that information will be sent to the correct communication device. As mentioned previously, subscriber location affects the type of information that will be collected and processed for delivery, as well as how it will be packaged. Processor 800 may use location data received from a plurality of sensors. For example, on site, the subscriber's location may be determined with great accuracy using motion sensors that provide input to the location subsystem 300 through on-site sensor interface 315, which receives and processes input from, for example, motion sensors. The subscriber may also wear an electronic ID such as a radio frequency (RF) badge that repeatedly reports its position through sensors distributed throughout the site, and that provide input to processor 800 so that the dynamic profile 710 can be updated. Floor-mounted sensors and microphones may also be used. Each member of a household may have a different frequency RF badge so the system may distinguish between them. Voice and face-recognition programs may also be useful for this purpose in connection with microphones and security cameras.

The on-site sensors may also be useful in determining when a subscriber has left, for example, a residence. If no motion is detected in the house, or a house camera detects that the subscriber's car is pulling away from the garage, these indications may mean the subscriber has departed. And even if the subscriber's position cannot be precisely determined, if a global positioning system (GPS) device in the subscriber's car is reporting changing coordinates, then the subscriber is likely in the car. Information can then be delivered accordingly. (If the car is used by more than one person, a schedule indication in the profile may assist in determining whether it is the subscriber who is actually traveling in it.)

Off site, a GPS transmitter may send location information to receiver 320, and use of a wireless phone or personal digital assistant (PDA) received through network interface 325 may trigger a (relatively less accurate) indication of the subscriber's location. Internet interface 330 may also be useful, albeit in an indirect manner. Presumably, no Web site will regularly report the subscriber's movements, but queries will be able to establish, for example, when a plane has departed or arrived. Coupled with profile 710 information indicating subscriber travel plans, this may be a reliable indication that for a certain time electronic communication would be pointless. Direct subscriber input received through subscriber interface 335, of course, may be the most reliable of all.

In the absence of or in addition to sensor/locator input, processor 900 may also analyze information already stored on database 700 to approximate the subscriber's location. A departure from the subscriber's residence, for example, occurring one hour previous will permit the inference that the subscriber is now at work, assuming no input to the contrary. Finally, if conflicting location information is detected by location subsystem 300, an appropriate notation may be made in database 700. The system may then also transmit an alert to all, or a selected subset of all communications devices to request that the subscriber confirm their current location. Alternatively, the location can be found by asking the user to "log in" or give voice commands whenever the user changes location. For example, when entering the car, the subscriber says: "new location . . . car", et cetera, and the system then updates (or confirms) the corresponding location information.

Figure 4:
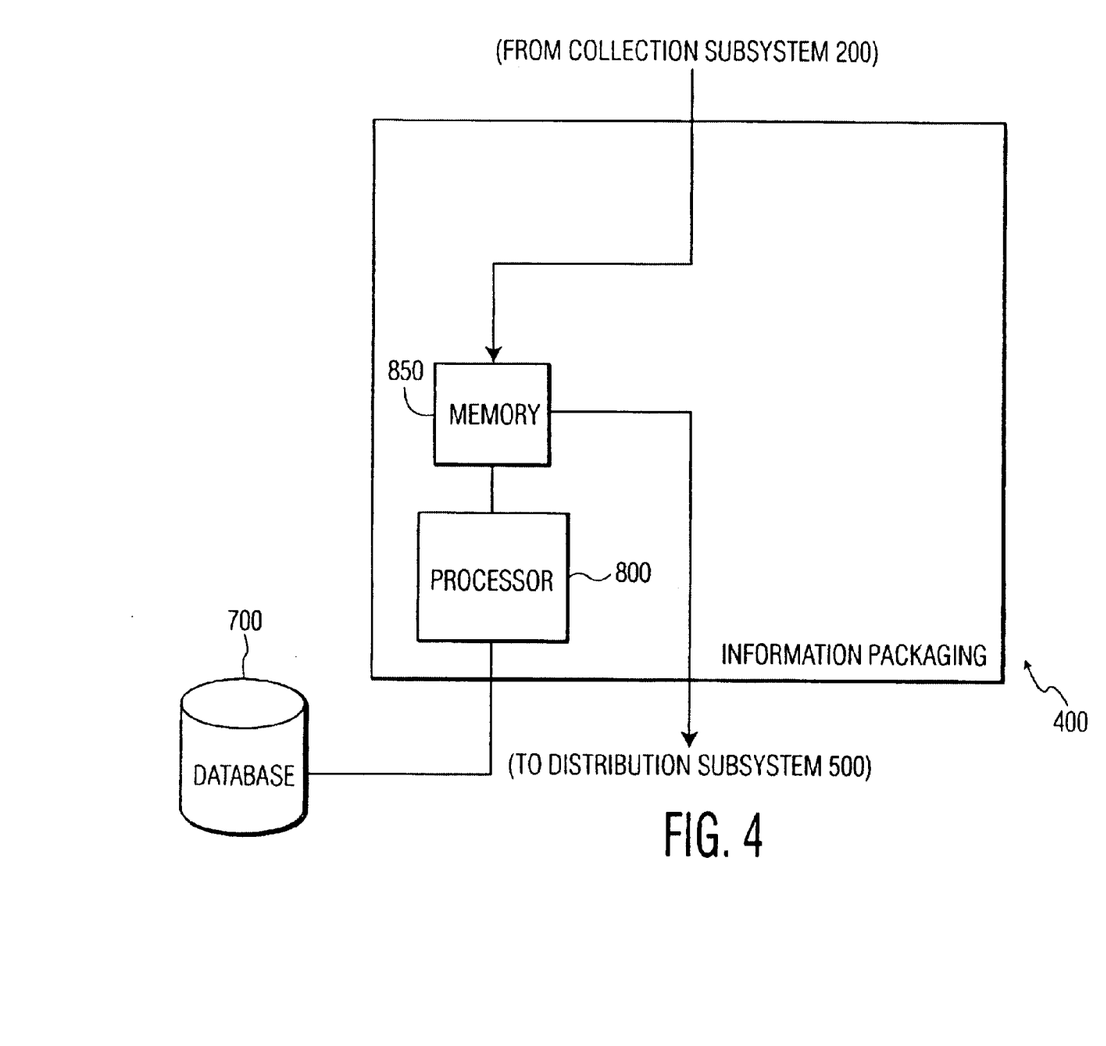
FIG. 4A is a block diagram illustrating selected components of the information packaging subsystem shown in FIG. 1, according to one embodiment of the present invention.
FIG. 4B is a block diagram illustrating in detail selected components of the information packaging subsystem shown in FIG. 1, according to one embodiment of the present invention.
Figure 4A:
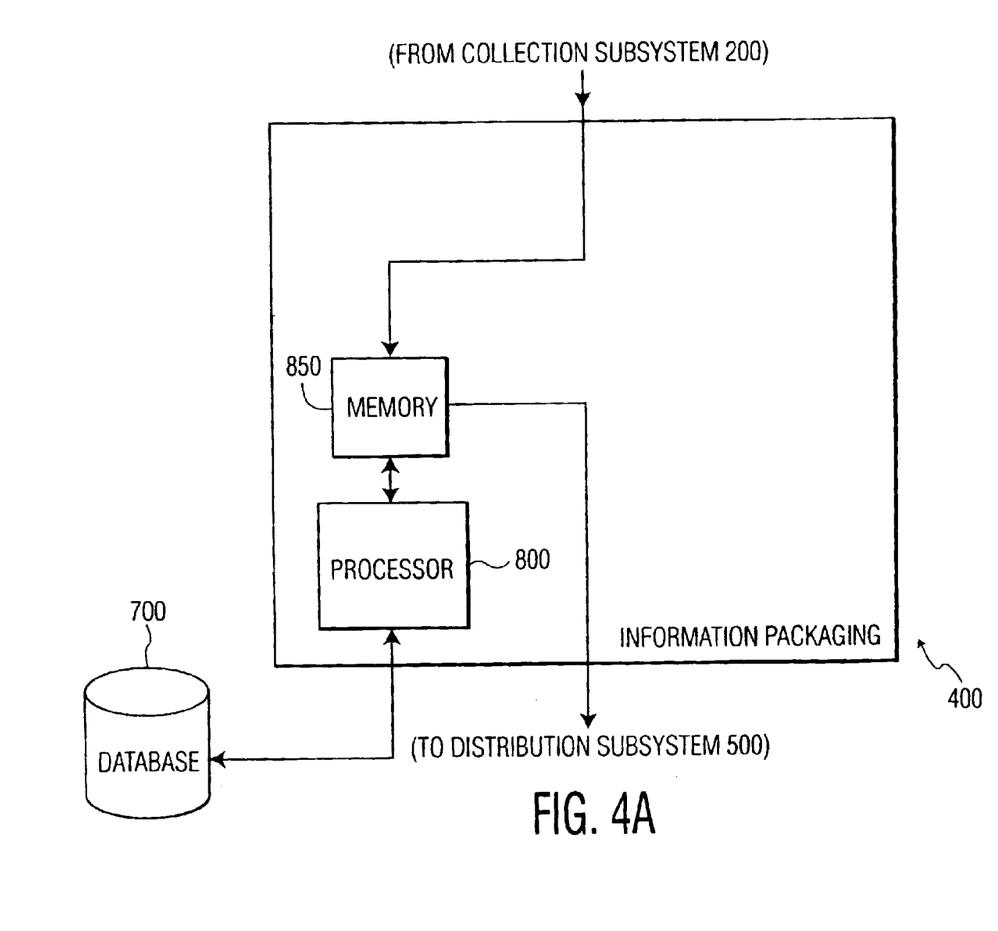

FIG. 4A is a block diagram illustrating in detail selected components of the information packaging subsystem 400 shown in FIG. 1, according to one embodiment of the present invention. This subsystem receives information collected and selected for delivery by the collection system 200. The information packaging subsystem 400 includes input buffer memory 850 for storing the received information. Processor 800 determines the end points of each information package segment. (Note that this segment is not necessarily a delivery unit, and there is no requirement that it be completely transmitted to the user.) The processor 800 also checks the current location files in database 700 to determine the subscriber's current location. Along with the current location, a processor reviews the selection of communications devices accessible by the subscriber at the current location, and chooses one or more of them as most suitable for delivery. This selection is made according to predetermined criteria also stored in database 700. The criteria may include, for example, the type and format of information being delivered and its relative importance. Subscriber delivery preferences may be included in the dynamic profile 710 and also taken into account. Once a device or devices are chosen, the information is packaged appropriately. Packaging simply refers to selecting which portions of the information to deliver and, if necessary, dividing it up into segments depending on the capacity of the recipient device and transmission channel over which the information is to be delivered. Packaging may also include augmenting the information from one source with content obtained from another. The system may be set up to search for this additional content under certain circumstances. Not uncommon, for example, a multimedia segment will be reduced in size by stripping away the audio and video portions and transmitting only text, or a series of text messages. Properly packaged, the information is stored in memory 850 (or in database 700) until fed to the distribution subsystem 500 for actual delivery. FIG. 4A illustrates a generalized version of information packaging system 400. In one more detailed embodiment, illustrated in FIG. 4B, the input signal (audio, video, other data, or a combination) enters information packaging subsystem 400a and is provided to transcript extractor 410, where a transcript is extracted from the input signal. At the same time, program type classifier 415 classifies the program based on its genre using classification information extracted from an electronic program guide (if available). Alternatively, the program genre can be found by using video analysis as described in U.S. patent application Ser. No. 09/452,581, entitled PROGRAM CLASSIFICATION USING OBJECT TRACKING, filed Dec. 1, 1999, by Nevenka Dimitrova, Lalitha Agnihotri, and Gang Wei; or by using transcript analysis as described in U.S. patent application Ser. No. 09/739,476, entitled Apparatus and Method of Program Classification Using Observed Cues in the Transcript Information, filed Dec. 18, 2000, by Kavitha Devara. (Both of the two proceeding Applications are owned by the assignee of the present Application and incorporated herein by reference.)

Figure 4B:
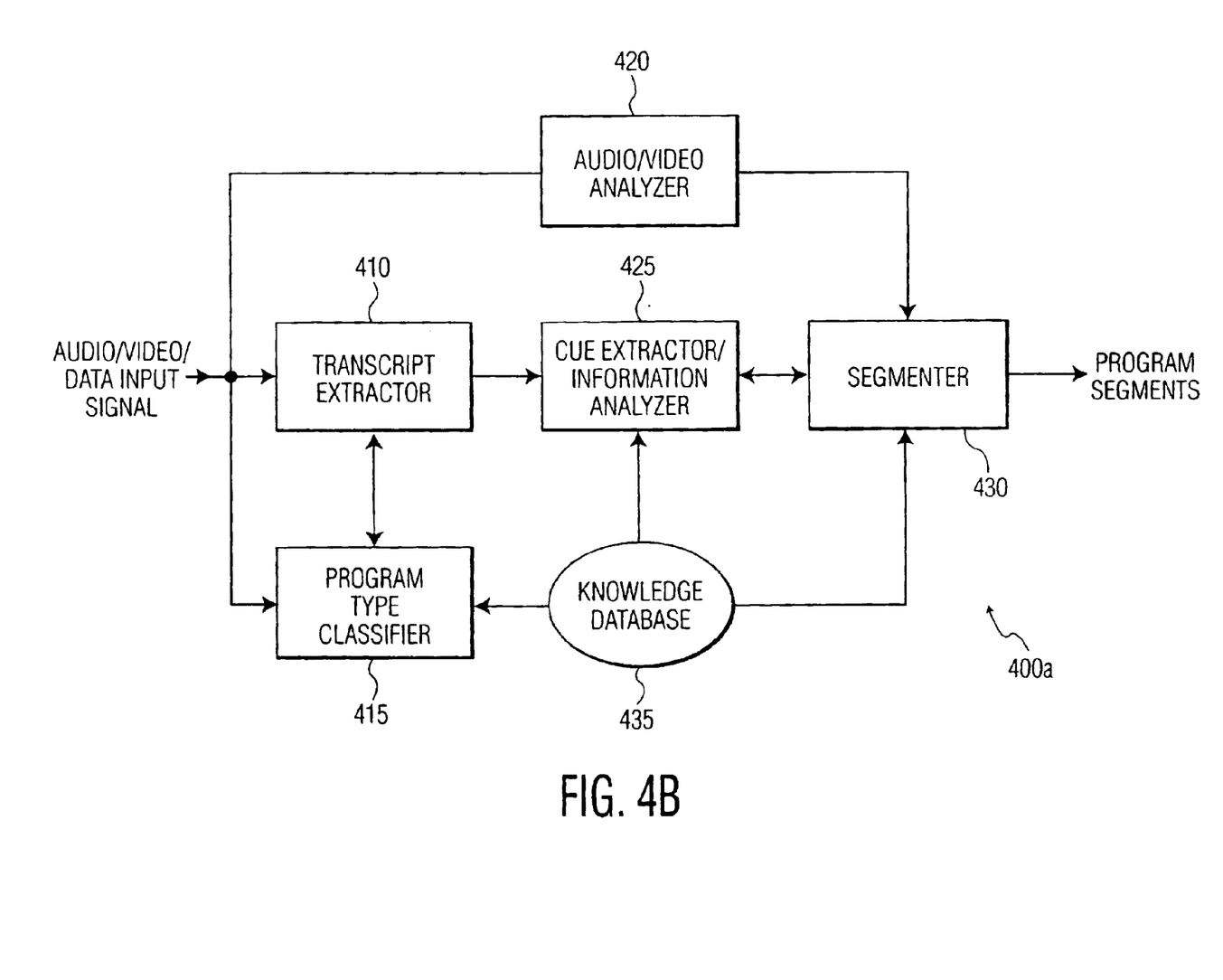

The cue extractor/information analyzer 425 receives the transcript from transcript extractor 410 and looks for cues present in the knowledge database 700 that signal the beginning of a new program segment such as a discrete news story. For example, triple arrows appearing in a closed-caption stream, or a generic lead-in phrase such as "in the sports tonight" or "weather with [name of announcer]" etc. These cues may vary, of course, based on the type of the program. Once the beginning of a new story is found the cue extractor/information analyzer 425 looks at the non-stop words in the text to find sections of text that seem coherent. This could be due to the fact that same words or similar words are being repeated. Alternatively, if no beginning is found then cue extractor/information analyzer 425 looks for points in the text where there is maximum incoherence between adjacent pieces of text. Audio/video analyzer 420 also receives the input signal, and analyzes is according to the character of the input itself. For example, the audio signal can be classified according to whether at any particular time it represents speech, silence, music, noise, et cetera. Likewise, the video portion of the input signal may be subjected to cut detection or color analysis to identify where it breaks down into distinct programming portions. Finally, segmenter 430 receives the output of audio/video analyzer 420 and cue extractor/information analyzer 425, along with any relevant information in knowledge database 435, and uses this input to make inferences regarding the story boundaries.

Packaged information at this point includes flags marking the beginning and end of each segment (a single item may be divided into segments for delivery) and an indication of the device or devices it should be sent to. Packaging subsystem 400 also prioritizes information for delivery, if multiple transmissions are required, and may discard some information if there is simply too much for the IIDS to handle. These determinations are made by processor 800 under the direction of control program 750 and with reference to profiles 710.

Figure 5:
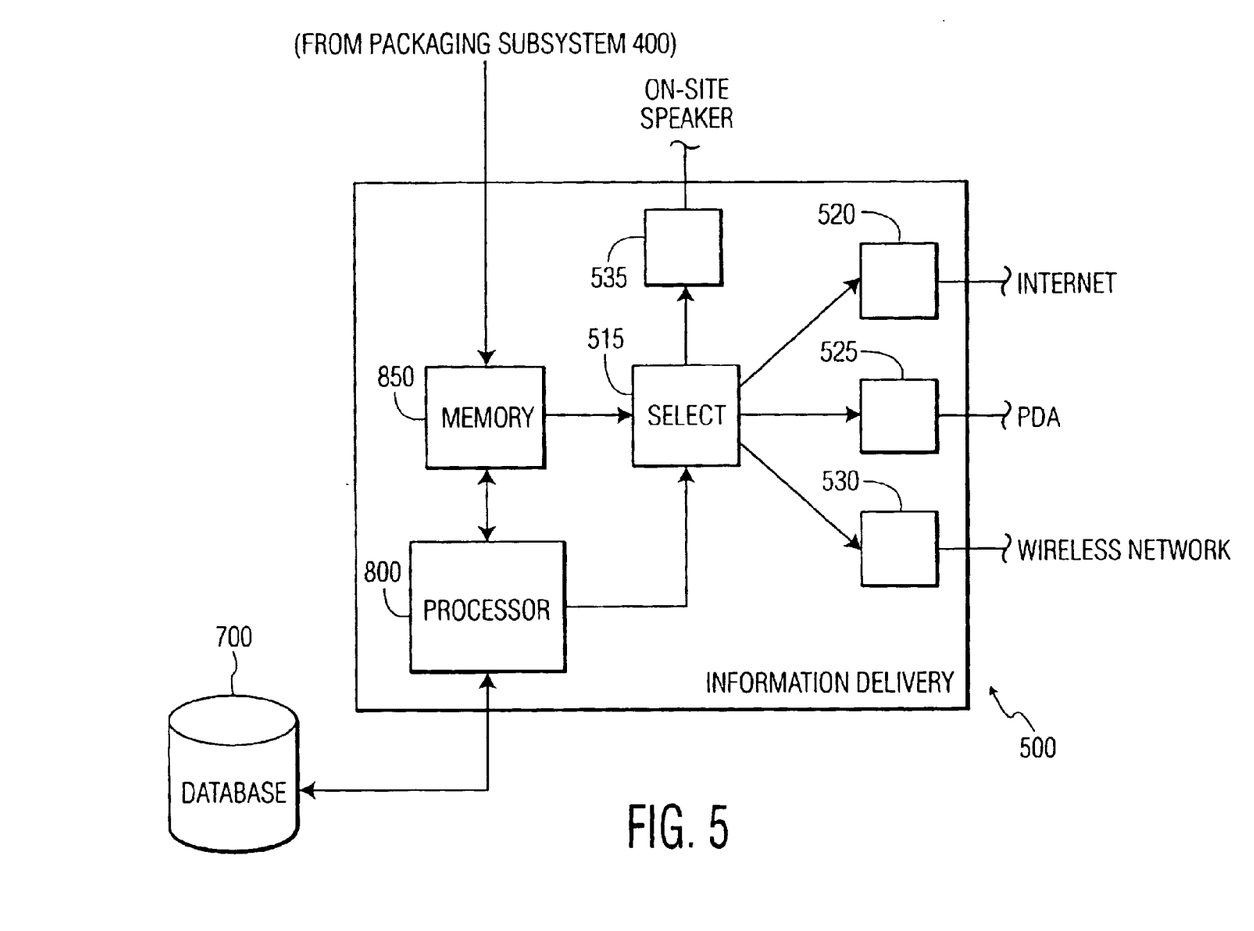
FIG. 5 is a block diagram illustrating in detail selected components of the information distribution subsystem shown in FIG. 1, according to one embodiment of the present invention.

FIG. 5 is a block diagram illustrating in detail selected components of the information distribution subsystem 500 shown in FIG. 1, according to one embodiment of the present invention. In this embodiment, information packaged by packaging subsystem 400 is received in distribution subsystem 500 in a standard format, along with an indication of the device or devices to which it should be sent to effect delivery. Stored temporarily in input buffer 850, the information is examined by processor 800 to determine how it should be sent. Processor 800 then directs output selector 515 to pass the information to the appropriate output processor. Internet output processor 520 converts the information into, for example, packetized data for transmission. PDA output interface 525 likewise prepares the output for transmission accordingly, that is, in a manner that would fit the resource and display capabilities of a PDA generally, and preferably the PDA that is expected to receive the information specifically. Some types of information, however, are handled differently. For example, a radio station traffic report may be sent in its entirety in audio form to a speaker or mobile phone. In the latter instance, the broadcast is buffered in buffer memory 850 until contact with the subscriber is actually verified by wireless phone interface 530, at which time processor 800 directs the output selector 515 to pass it from memory to the subscriber. Voicemail messages may be handled in a similar fashion. On-site speaker interface 535 simply sends audio signals to an on-site speaker or set of speakers associated with the subscriber's current on-site location. Preferably, a text-to-speech or voice recognition format converter (not shown) is included and used as necessary. Generally, format conversion program 740 supervises the conversion process. Separate output processors under the direction of processor 800 are shown for convenience only, there may be any number of processing units to handle each anticipated conversion process, considering all input sources and all output devices. The devices and device interfaces shown in FIG. 5 are exemplary and not intended to limit the scope of the invention.

Note that some information received in information collection subsystem 200 may simply be routed to a subscriber through an appropriate communication device. For example, a radio traffic report relating adverse conditions along the subscriber's anticipated route to work may be routed to a speaker near the shower where the subscriber is currently located. If the subscriber is already in transit, the information could be transferred for delivery to a car radio or (after modifying its format appropriately) sent to a car phone, sent as an email to a portable email device, or sent as a message to a pager. Although very little may be done to the actual radio signal, the information will still be considered to be packaged and formatted for distribution according to the present invention. Additional information on transcoding is available in R. Mohan, J. Smith & C. S. Li, *Adapting Multimedia Internet Content for Universal Access*, IEEE TRANSACTIONS ON MULTIMEDIA (March 1999) at 104–114, which is incorporated herein by reference.

Figure 6:
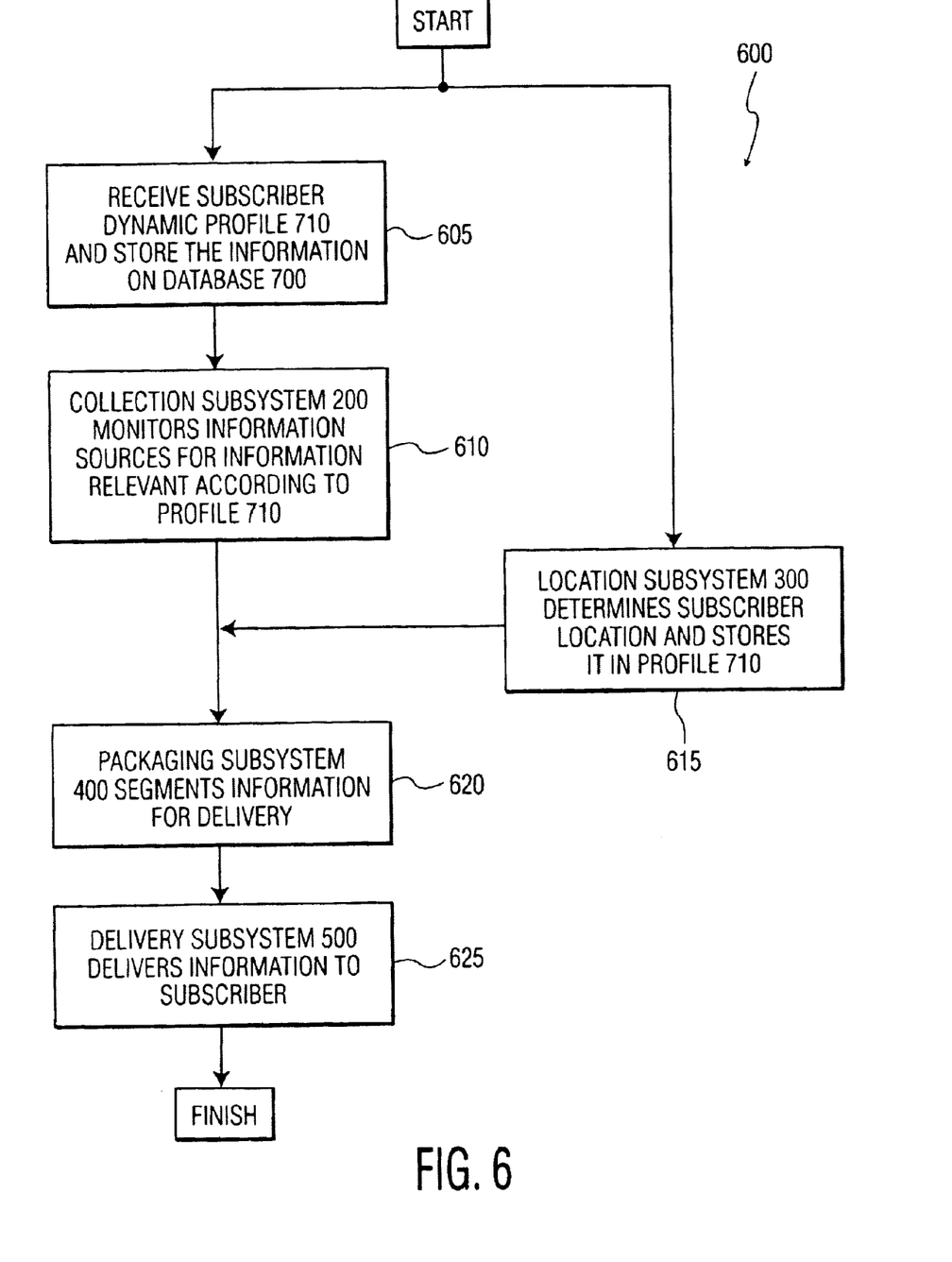
FIG. 6 is a flow chart illustrating a method of operating an IIDS according to an embodiment of the present invention.

FIG. 6 is a flow chart illustrating a method 600 of operating an IIDS 100 according to an embodiment of the present invention. Initially, (process step START), the system hardware has been configured, for example, as described in reference to FIG. 1, above. To begin, the IIDS 100 must receive at least one (partial or complete) subscriber dynamic profile 710 and store the information on database 700 (process step 605). Note that herein the subscriber profiles 710 are referred to as "dynamic" because in normal operation it will not only be subject to amendment, but will frequently be changed to reflect a new subscriber location, and corresponding references to communication devices will be updated as well. Although the dynamic profile is expected to change frequently, however, there is no requirement that it do so. Armed with this profile 710, the collection subsystem 200 monitors one or more input sources for information that in accord with profile 710, should be delivered to the subscriber (process step 610). The subscriber's location is determined (and frequently redetermined) by location subsystem 300 and stored on database 700 in dynamic profile 710 (process step 615). The information can then be processed for delivery by packaging subsystem 400 (process step 620) and then properly formatted by distribution subsystem 500 and delivered through one or more communication devices to the subscriber (process step 625). In processing the information (augmented or unaugmented) involving a plurality of segments, the segments may be prioritized (for example, according to the information in profile 710) for personalized delivery. Finally, a confirmation of delivery (or attempted delivery) is optionally recorded for later reference (step not shown).

Although the present invention has been described in detail, those skilled in the art should understand that they can make various changes, substitutions and alterations herein without departing from the spirit and scope of the invention in its broadest form.

What is claimed is:

1. A system for selectively delivering information to a subscriber, said system comprising:
    a database for storing a dynamic profile including the subscriber's information preferences and last-known location, and for storing a list of communication devices available to the subscriber for receiving information, the list of communication devices including access information related to each device;
    a locator system in communication with the database for determining the location of the subscriber;
    a collector for receiving information from a plurality of information sources, the collector comprising a processor in communication with the database for selecting which information to prepare for delivery to the subscriber according to the subscriber's information preferences and last-known location;
    an information packager in communication with the database and with the collector, for packaging the information selected for delivery; and
    a delivery system in communication with the database and with the information packager for formatting the packaged information and transmitting it to the subscriber through at least one of the listed communications devices corresponding to the subscriber's location.

2. The system of claim 1, wherein the information is transmitted to the subscriber in substantially the same format as the format in which it was received.

3. The system of claim 2, wherein the information is transmitted to the subscriber at substantially the same time as the time at which it is received.

4. The system of claim 2, wherein the information is stored in a storage device until it can be transmitted to the subscriber.

5. The system of claim 1, further comprising a control program for directing operation of the system.

6. The system of claim 1, further comprising a format conversion program for directing format conversion by the delivery system.

7. The system of claim 1, wherein the delivery system is capable of converting an audio signal into at least one text message for delivery to the subscriber.

8. The system of claim 1, wherein the delivery system is capable of converting text information into an audio format for delivery to the subscriber.

9. The system of claim 1, wherein the packaged information comprises a notation indicating at least one communication device to which the information should be transmitted.

10. The system of claim 1, wherein the system is capable of determining whether transmitted information is received by the at least one communication device.

11. The system of claim 1, wherein the packaged information is stored until it can be transmitted to the subscriber.

12. The system of claim 1, wherein the collector actively searches to locate information available through an information network.

13. The system of claim 12, wherein the information network is the Internet.

14. The system of claim 12, wherein the collector requests content from a located Web site.

15. The system of claim 1, wherein the packager prioritizes information packages when more than one information package is available for transmitting to the subscriber.

16. The system of claim 1, wherein the collector, in determining which information to feed to the packager, analyzes the content of the received information according to a predetermined algorithm.

17. The system of claim 1, wherein the information packager packages information from a variety of sources to prepare augmented information content for delivery to the subscriber.

18. The system of claim 17, wherein the system automatically searches for information to use in preparing the augmented information content.

19. The system of claim 1, wherein the locator system includes at least one camera for locating the subscriber using an acquired visual image.

20. The system of claim 1, wherein the locator system includes at least one uses a global positioning system (GPS) device for locating the subscriber using a GPS signal.

21. The system of claim 1, wherein the locator system provides an alert that the subscriber is moving from one location to another.

22. The system of claim 21, wherein the delivery system transmits the packaged information to at least a second communication device after receiving the alert.

23. A method for selectively delivering information to a subscriber, said method comprising the steps of:
   maintaining a database containing at least one subscriber dynamic profile and a list of communication devices through which information may be delivered to the subscriber;
   receiving information from a plurality of sources;
   determining the last-known location of the subscriber;
   comparing the received information to the dynamic profile to determine which portions of the received information should be delivered to the subscriber;
   preparing an information package containing information determined to be appropriate for delivery; and
   transmitting the information package to the subscriber through one or more of the listed communications devices corresponding to the subscriber's last-known location.

24. The method of claim 23, wherein the information package comprises a notation indicating at least one communication device to which the information should be transmitted.

25. The method of claim 23, further comprising the step of confirming receipt of the transmitted information by at least one communication device.

26. The method of claim 23, further comprising the step of storing the information until it can be transmitting to the subscriber.

27. The method of claim 23, further comprising the step of prioritizing multiple information packages for transmission.

28. The method of claim 23, further comprising the step of augmenting an information package from a first source with additional content obtained from a second source.

29. The method of claim 28, further comprising the step of searching for additional content prior to augmenting the information package from the first source.

30. The method of claim 29, wherein the search for additional content is initiated automatically.

31. The method of claim 23, further comprising the step of translating the information from the format in which it was received into a different format before transmitting it to the subscriber.

32. The method of claim 31, wherein the step of translating the information includes translating information received as an audio transmission into a text format.

33. The method of claim 31, wherein the step of translating the information includes translating information received in text format into audio-signal format.

34. The method of claim 23, further comprising the step of searching for information through an information network.

35. The method of claim 34, wherein the step of searching includes requesting content from a Web site.

36. A signal comprising an information package suitable for transmission to a subscriber, said signal generated by the steps of:
   receiving information from a plurality of sources;
   determining the last-known location of the subscriber;
   comparing the received information to a subscriber dynamic profile stored in a database to determine which portions of the received information should be delivered to the subscriber;
   determining from the subscriber dynamic profile a list of communication devices through which information may be delivered to the subscriber;
   preparing the information package containing information determined to be appropriate for delivery; and
   transmitting the information package to the subscriber through one or more of the listed communications devices corresponding to the subscriber's last-known location.

37. The signal of claim 36, wherein the information package comprises a notation indicating at least one communication device to which the information should be transmitted.

38. The signal of claim 36, further comprising the step of storing the information until it can be transmitting to the subscriber.

39. The signal of claim 36, further comprising the step of prioritizing multiple information packages for transmission.

40. The signal of claim 36, further comprising the step of augmenting an information package from a first source with additional content obtained from a second source.

41. The signal of claim 40, further comprising the step of searching for additional content prior to augmenting the information package from the first source.

* * * * *